United States Patent
Shae

(10) Patent No.: US 7,273,078 B2
(45) Date of Patent: Sep. 25, 2007

(54) TREE DELIMBER ROLLER SYSTEM WITH AUTOMATIC ROLLER ADJUSTMENT

(75) Inventor: Steve Shae, Owatonna, MN (US)

(73) Assignee: Blount, Inc., Montgomery, AL (US)

( * ) Notice: Subject to any disclaimer, the term of this patent is extended or adjusted under 35 U.S.C. 154(b) by 0 days.

(21) Appl. No.: 11/085,787

(22) Filed: Mar. 21, 2005

(65) Prior Publication Data

US 2006/0157156 A1    Jul. 20, 2006

Related U.S. Application Data

(60) Provisional application No. 60/644,046, filed on Jan. 14, 2005.

(51) Int. Cl.
*A01G 23/095* (2006.01)

(52) U.S. Cl. .................... 144/24.13; 144/208.2

(58) Field of Classification Search ............ 144/338, 144/343, 382, 4.1, 24.13, 208.1, 208.3, 208.5, 144/208.8, 208.9
See application file for complete search history.

(56) References Cited

U.S. PATENT DOCUMENTS

| | | | |
|---|---|---|---|
| 4,899,794 A | | 2/1990 | Hamby, Jr. |
| 5,515,895 A | * | 5/1996 | Hamby, Jr. ............... 144/24.13 |
| 5,704,407 A | * | 1/1998 | Hamby, Jr. ............... 144/24.13 |
| 6,167,927 B1 | * | 1/2001 | Holmes, III ............. 144/24.13 |

* cited by examiner

*Primary Examiner*—Shelley M. Self
(74) *Attorney, Agent, or Firm*—Brinks Hofer Gilson & Lione

(57) ABSTRACT

A tree delimber including a base frame rotatably supporting a yoke assembly and a cutting head assembly. The yoke assembly is journalled for rotation in a ring bearing on the base frame, adjacent its front end, and supported by a pair of roller units adjacent its rear end. Each roller unit includes a vertically adjustable roller, adjustment being automatically effected by horizontal movement of a wedge driven by a control rod under the influence of fluid pressure in a hydraulic cylinder.

10 Claims, 5 Drawing Sheets

TREE DELIMBER ROLLER SYSTEM WITH AUTOMATIC ROLLER ADJUSTMENT

RELATED APPLICATION

This application is related to Provisional U.S. Patent Application Ser. No. 60/644,046 filed Jan. 14, 2005, and entitled TREE DELIMBER ROLLER SYSTEM, and claims priority from that provisional Application.

FIELD OF THE INVENTION

This invention also relates in general to an apparatus for delimbing trees during tree harvesting operations. It relates particularly to a stationary tree delimber of the type which includes a cutter head assembly mounted on a support frame for rotation about a vertical axis.

BACKGROUND OF THE INVENTION

A conventional delimber of the general type this invention is concerned with is illustrated in Hamby, Jr. U.S. Pat. No. 4,899,794. There it will be seen that a cutter head assembly is mounted in a support yoke for pivotal movement about a horizontal axis relative to the yoke. In turn, the yoke includes a base plate which is mounted for rotational movement about a vertical axis on a horizontal support frame. The yoke base plate is supported for this rotation on an annular bearing adjacent the front end of the delimber. Adjacent the rear end of the delimber a pair of support rollers fastened to the bottom of the yoke base plate ride on the top surface of the support frame in an arc to support the yoke and cutter head assembly as they rotate during delimber operation.

With delimbers of this type, it is conventional to provide some kind of vertical adjustment capability for the afore-described support rollers. Current technology in general use is to mount rollers on the support frame, rather than on the yoke base plate as is shown in the Hamby, Jr. '794 patent delimber. This technology involves support rollers that are vertically adjustable to assure positive contact with the bottom surface of the yoke base plate. Adjustment is conventionally effected through the use of four vertical bolts, one on either side of each of two rollers. The bolts are fixed in place by jam nuts which are tightened against the roller housing. These bolts must be accessed from underneath the delimber support frame, and are threaded inward to raise a roller and outward to lower the roller. Careful attention must be given to adjusting each of the bolts equally to ensure parallel contact between the roller and the bottom surface of the yoke base plate because operation with one side of a roller higher than the other will result in uneven wear of the roller, roller bushings, and the mating yoke base plate surface.

Adjustment is made difficult because access to the bottom of the base frame is commonly obstructed due to cut limbs and other debris that build up around the delimber on the job site. Furthermore, knowing when individual roller height has been properly adjusted is also a problem because the area of contact between the yoke base plate and a roller is not readily visible to the operator from the adjustment area.

Recently a new and improved roller support system for the cutter head assembly and yoke in a tree delimber was invented by the applicant in the present application. That system is described and illustrated in the aforementioned provisional U.S. Patent Application Ser. No. 60/644,046, the disclosure of which is incorporated herein by reference.

The provisional U.S. patent application discloses a roller support system which is much easier for an operator to adjust then previously known systems. The system's rollers each require manipulating only a single adjustment screw. The adjustment screw for each of two rollers is readily accessible to the delimber operator. Adjustment remains a manual operation, however.

SUMMARY OF THE INVENTION

An object of the present invention is to provide automatically adjustable rollers in a roller support system for the cutter head assembly and yoke in a tree delimber.

Another object is to provide a roller support system which automatically adjusts the vertical position of the rollers in the system for constant, optimum yoke support during delimber operation.

The roller adjustment feature of the roller system in the present invention utilizes a sliding wedge and a hydraulic cylinder to position each of two rollers and properly support the delimber yoke. Hydraulic pressure to the cylinders is supplied from an accumulator which exists in the delimber assembly for the purpose of providing hydraulic pressure to delimbing knives. When a load is applied to the delimber, such as drawing a tree through the delimber to remove tree limbs, a check valve prevents oil from exiting the cylinders. This maintains each roller in a preset position while the load is applied. This adjustment is fully automatic and does not require the operator to enter the area below the delimber, which is typically blocked by debris. The sliding wedge mechanism ensures parallel contact between the roller assembly and the bottom surface of the yoke with no additional attention required from the operator.

Each of the roller units comprises a roller box weldment welded into the support frame. A hydraulic cylinder is fastened to the back of each roller box weldment and a sliding wedge is set into top side of the roller box weldment. A roller and shaft assembly is then set into each roller box weldment.

Vertical movement of the shaft is facilitated by vertical slots milled into the sides of the roller box weldment. The shaft slides in these slots. The roller shaft has a flat milled on its side on each end. The flats rest on the top surface of the sliding wedge, limiting the downward travel of the roller assembly. Upward travel of the roller assembly is limited by contact with the bottom surface of the yoke base plate.

A typical application will utilize two rollers to support the yoke. However, a single roller or any multiple of rollers may be used to perform this function. A hydraulic circuit is provided between the cylinders and the accumulator. A pressure reducing valve may be installed within the hydraulic circuit to limit the pressure supplied to the cylinders and avoid excessive force applied to the roller components and the yoke. Depending on the design of the pressure reducing valve, the passage of oil from the cylinder through the valve may effectively be blocked by the valve geometry as the pressure in the cylinder exceeds the threshold setting of the valve. In this case, it may be possible to eliminate check valves from the circuit and rely solely on the function of the pressure reducing valve.

With the yoke fastened to the rotational bearing, (which is rigidly mounted in a horizontal plane) the roller(s) are positioned approximately ¼" below the bottom surface of the yoke. When at rest, the entire load of the delimber is normally supported by the rotational bearing with little support from the rollers, however.

Pressurization of the delimber accumulator is required before the delimbing procedure can be started. This accomplished by the loader operator, who opens and closes the delimbing knives through several cycles, allowing hydraulic pressure from the loader to charge the accumulator. Pressure from the charged accumulator is also supplied to the hydraulic cylinders through the (optional) pressure reducing valve and the check valve. Each pressurized cylinder exerts a force on the back of a wedge to cause it to slide away from the centerline of the base assembly. As the wedge slides, the roller shaft rides up the angled top surface of the wedge, causing the roller to rise to the point of contacting and supporting the bottom surface of the yoke.

The maximum pressure within the accumulator is limited by the hydraulic components within the existing delimber hydraulic circuit. The pressure supplied to the auto adjust cylinder may be further limited by the optional pressure reducing valve. Adjusting the pressure reducing valve to a higher setting will increase the force applied to the bottom surface to the yoke while a lower setting will decrease the force. A properly adjusted, pressure reducing valve will result in a force equal to the weight of the rear of the delimber assembly, causing the delimber rotational bearing to be subjected to only vertical force.

Applying a large load to the roller mechanism, such as that resulting from tree delimbing operations, may result in a force large enough to overcome the limited pressure supplied to the cylinders. In this case, the check valve will prevent oil from exiting the cylinder as the load is applied, therefore maintaining the position of the wedge and roller assembly. The tree delimbing operation procedures will result in periods of high load as a tree is pulled through the delimber as well as periods of zero load as the next tree is selected. During the periods of zero load the accumulator pressure will cause the check valve to open, allowing oil to flow into the cylinder and increase the height of the roller assembly so as to automatically account for any wear in the roller or bottom surface of the yoke.

BRIEF DESCRIPTION OF THE DRAWINGS

The invention, including its construction and method of operation, is illustrated more or less diagrammatically in the drawings, in which.

DESCRIPTION OF THE PREFFERED EMBODIMENT

Figure 1:
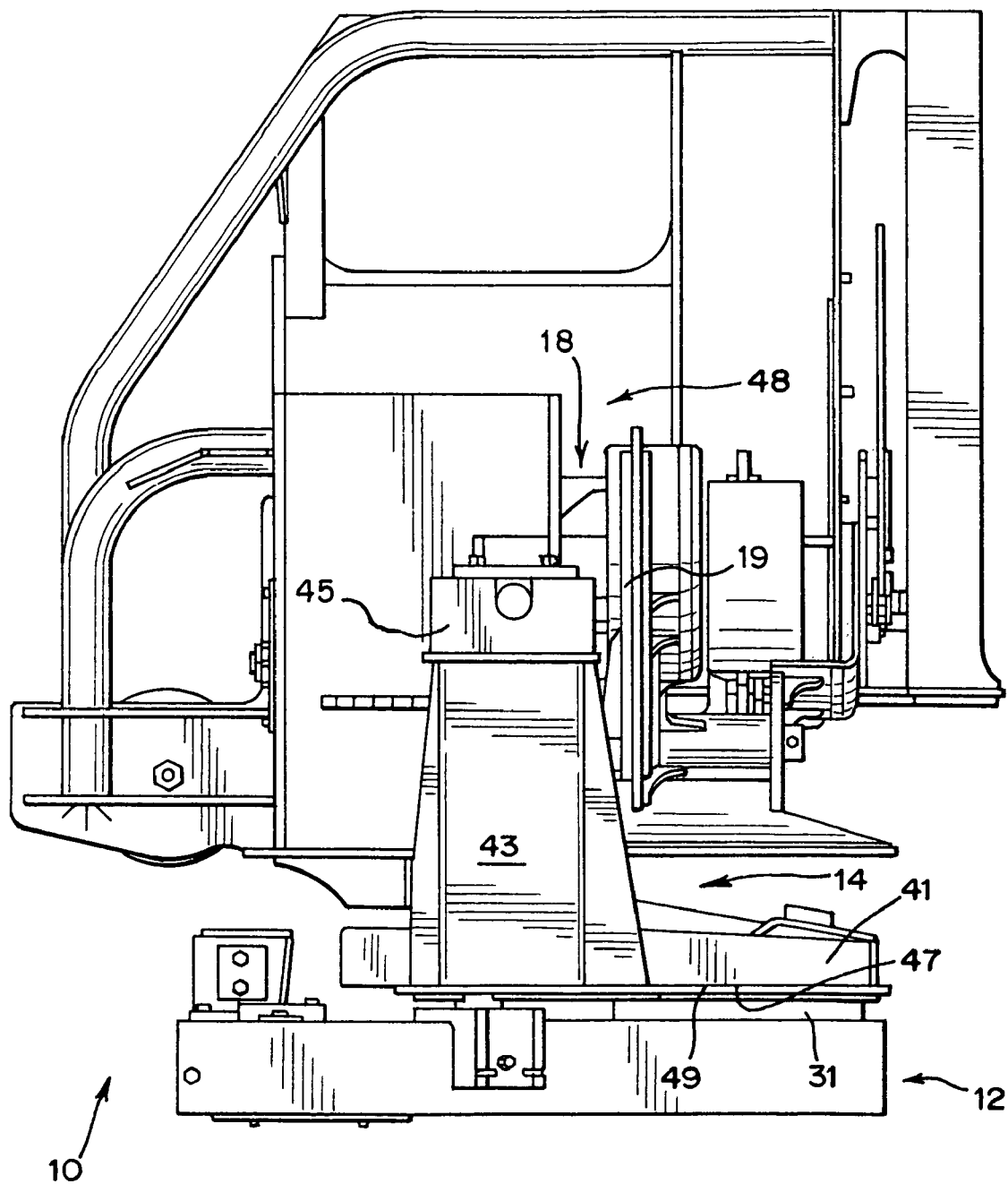
FIG. 1 is a site elevational view of a tree delimber incorporating the automatic roller adjustment system of the present invention.
Figure 2:
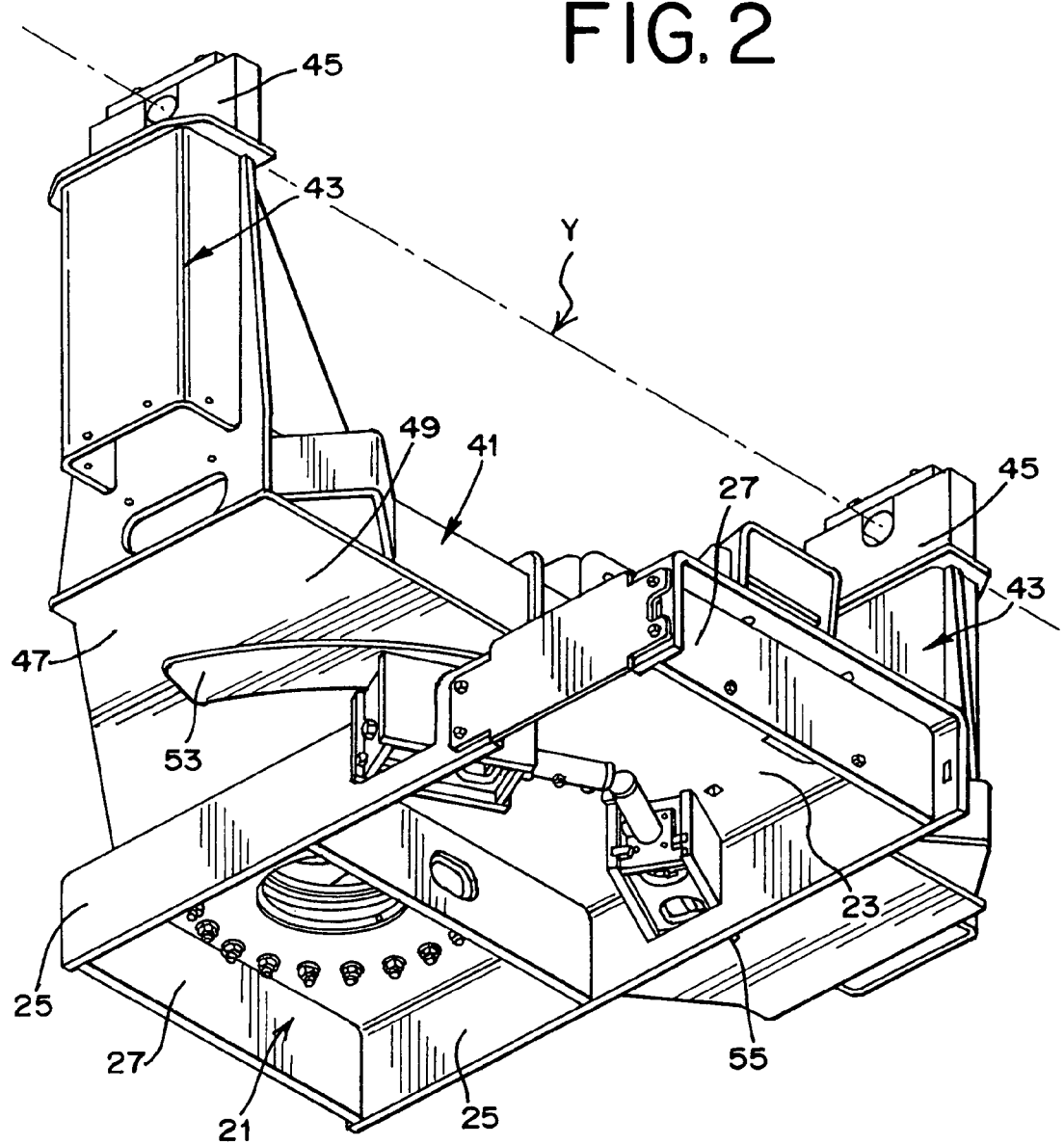
FIG. 2 is a bottom perspective view of the tree delimber of FIG. 1, with parts removed.

Referring now to the drawings, and particularly to FIGS. 1 and 2, a tree delimber embodying features of the present invention is seen generally at 10. The delimber comprises three major components, a base frame 12, a yoke assembly 14 and a cutter head assembly 18. The yoke assembly 14 is mounted for rotational movement on the base frame 12 about a vertical axis. The yoke assembly 14 supports the cutter head assembly 18 for pivotal movement about a horizontal axis. The cutter head assembly 18 is in position to cut the limbs of a downed tree with delimbing knives 19 (one shown) being drawn horizontally through the delimber 10 on the axis and to saw the top of the tree off. In this regard, the downed tree is pulled through the delimber 10 in conventional manner by a forestry loader or the like.

Figure 3:
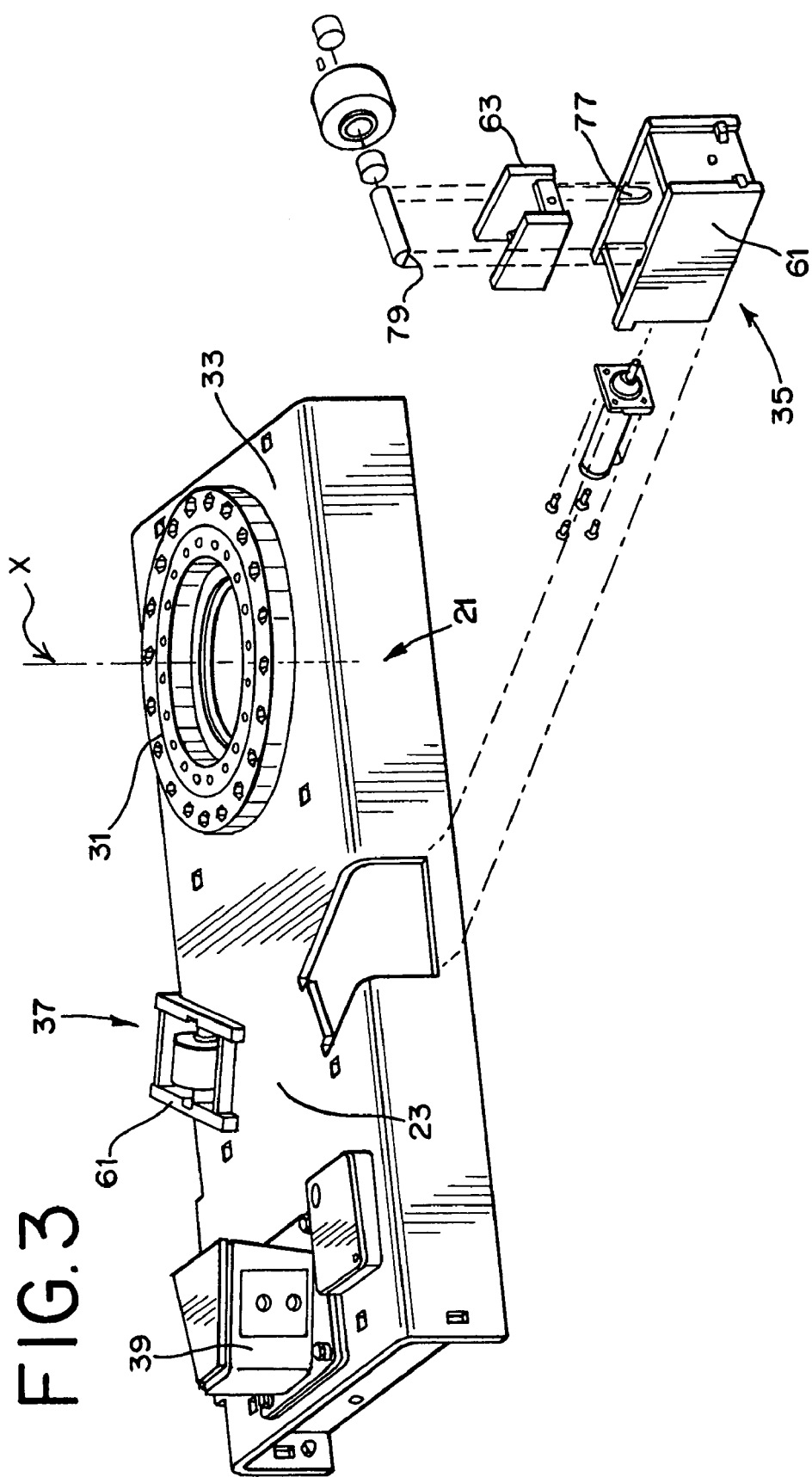
FIG. 3 is a top perspective view of the delimber base frame, with part of the roller system exploded out.
Figure 4:
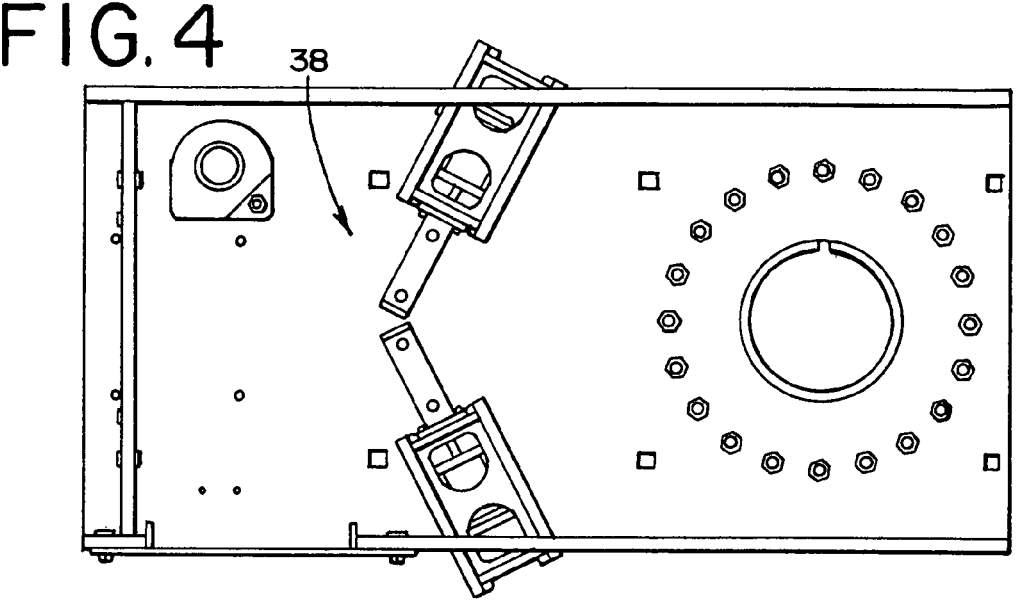
FIG. 4 is a bottom plan view of the base frame.
Figure 5:
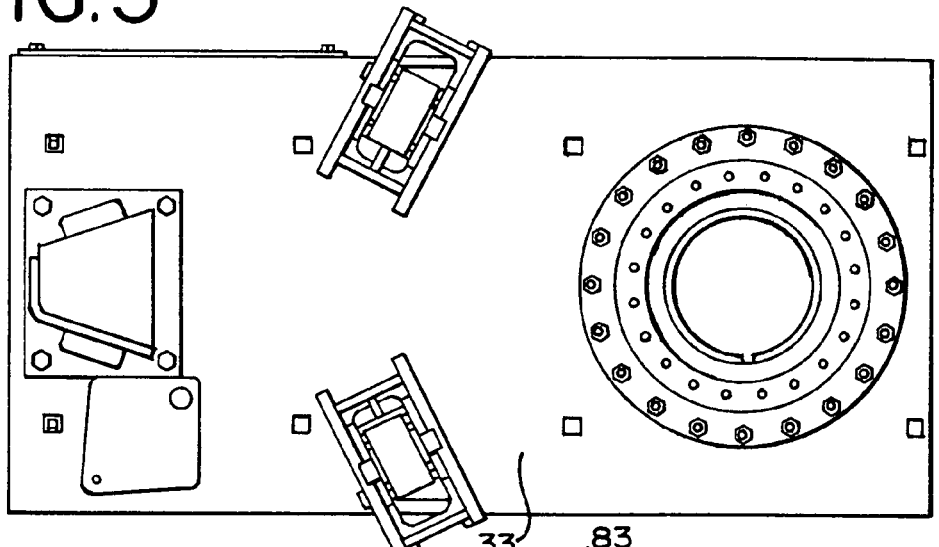
FIG. 5 is a top plan view of the base frame.
Figure 6:
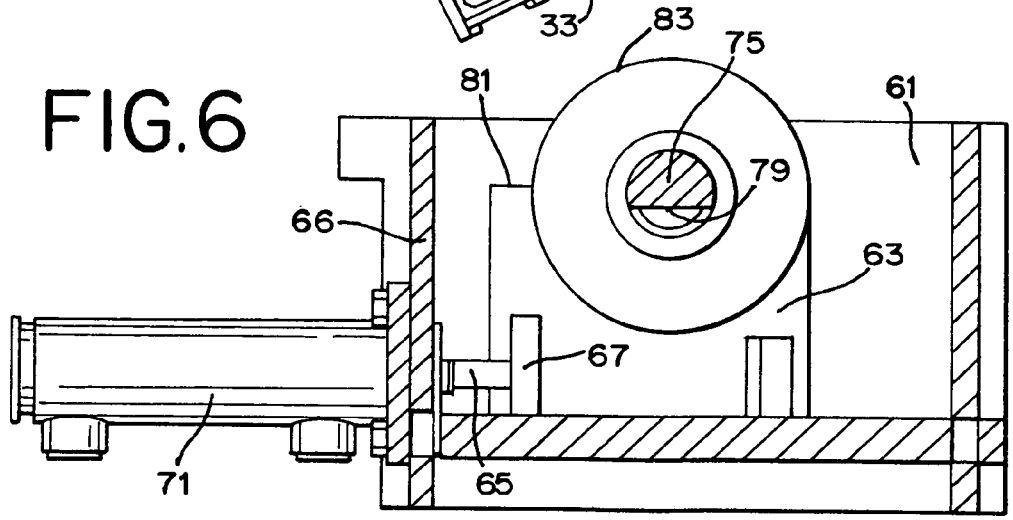
FIG. 6 is longitudinal sectional view through one of the roller sub-assembles in the roller system of the invention.

Referring now also to FIGS. 3-5, the base frame 12 comprises a rectangular box structure 21 fabricated of steel plate by conventional welding techniques. The box structure 21 includes a roof plate 23, side plates 25 bent downwardly there from and end plates 27. The box structure 21 is adapted to be mounted on a suitable transport device (not shown) for moving the delimber 10 from location to location.

An annular bearing ring 31 is fastened to the upper surface 33 of the roof plate 23, adjacent the front end of the box structure 21. The yoke assembly 14 is rotatably mounted on the box structure 21 in the bearing ring 31.

Also mounted on the box structure 21, and protruding out of the roof plate 23 and respective side plates 25, are identical but oppositely oriented support roller units 35 and 37. The roller units 35 and 37 are components of the roller support system 38 embodying features of the invention.

The system 38 supports the yoke assembly 14 as it rotates about the vertical axis X around its mounting on the bearing ring 31 at the front end of the base frame 12. On the opposite (rear) end of the base frame 12 from the bearing ring 31 is a stop unit 39 for limiting rotation of the yoke assembly 14 about the axis X of the bearing ring 31.

As seen in FIG. 2, the yoke assembly 14 includes a box-like frame 41 fabricated in a conventional manner of steel plate. The frame 41 is surmounted by upright pillars 43 on opposite sides. On top of each pillar 43 is a bearing block 45. These bearing 45 blocks pivotally support the cutter head assembly 18 for pivotal movement about a horizontal ais Y.

Forming the bottom of the frame 41, and extending out from under it in a direction transverse to the box and pillars 45, is a floor plate 47. The bottom surface 49 of this plate 47 designed to seat in, and rotate on, the bearing ring 31 which is top of the base frame 12. At the same time, bearing tracks 53 and 55 fastened to the surface 49 are designed to ride on corresponding roller units 35 and 37 which are identical to each other and form part of the roller support system 38.

As seen in FIGS. 3-6, each roller unit 35 and 37 includes a roller housing weldment 61 welded into the box structure 21. A wedge 63 is slideable in the roller housing weldment 61. A piston rod 65 is fastened to the vertical wall 67 of the wedge 63. The rod 65 extends out of a hydraulic cylinder 71 fastened to, and extending away from the wall 66.

Each roller unit 35 and 37 also includes a roller shaft 75 seated in vertical slots 77 formed into opposite sides of the roller box 61. The shaft 75 has a flat 79 milled in its side on each end that rests on a top surface 81 of a corresponding wall in the sliding wedge 63. Vertically downward movement of the roller 83 is limited by engagement of these shaft flats 79 with the wedge 63. Vertically upward travel of the roller 83 is limited by its contact with the bottom surface of the corresponding track 53, 55.

With the yoke assembly 14 fastened to the rotational bearing 31, which is rigidly mounted in a horizontal plane, the rollers 83 will be positioned approximately ¼" below the bottom surface of the bearing tracks 53,55. Each rod 65 is then moved by fluid pressure in a cylinder 71 to cause the wedge 63 to slide away from the centerline of the yoke assembly 14. As the wedge 63 slides, the roller shaft 75 rides up the angled top surface 81 of the corresponding wall in the wedge 63, causing the roller 83 to rise to the point of engaging the bottom surface of the corresponding bearing track 53, 55.

Figure 7:
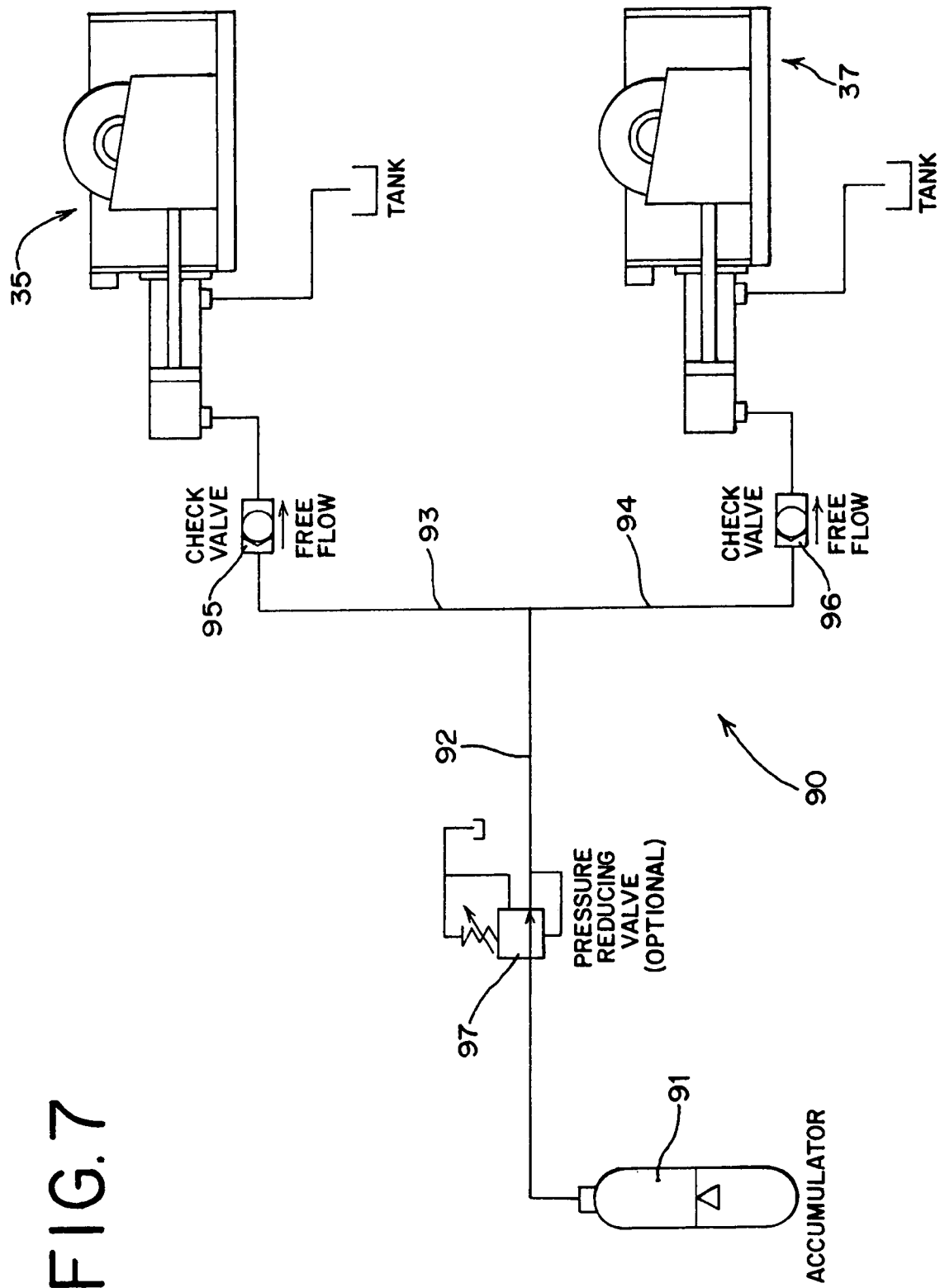
FIG. 7 is a schematic view of the roller system, showing the hydraulic components and then arrangement in the system.

Referring now to FIG. 7, the hydraulic system for the roller units 35 and 37 is shown schematically at 90. The system 90 includes a conventional hydraulic accumulator 91. The accumulator is connected to respective roller assemblies 35 and 37 by hydraulic line 92 which splits into lines 93 and 94. Check valves 95 and 96 are provided in lines 93 and 94 respectively. A pressure reducing valve 97 in the line 92 is optional.

Pressurization of the delimber accumulator is accomplished before the delimbing procedure can be started. This is accomplished by the operator, who opens and closes the delimbing knives through several cycles, allowing hydraulic pressure from the loader to charge the accumulator. Pressure from the charged accumulator is then supplied to the hydraulic cylinders through the (optional) pressure reducing valve and the check valves. Each pressurized cylinder exerts a force on the back of a wedge to cause it to slide away from the centerline of the base assembly. As the wedge slides, the roller shaft rides up the angled top surface of the wedge, causing the roller assembly to rise to the point of contacting the bottom surface of the yoke.

As previously pointed out, the maximum pressure within the accumulator is effective at the cylinders and may be further limited by an optional pressure reducing valve. Adjusting the pressure reducing valve to a higher setting will increase the force applied to the floor plate 47 forming the bottom surface 49 of to the yoke while a lower setting will decrease the force.

The tree delimbing operation procedures will result in periods of high load as a tree is pulled through the delimber as well as periods of zero load as the next tree is selected. During the periods of zero load the accumulator pressure will cause the check valve to open, allowing oil to flow into the cylinder and increase the height of the roller assembly so as to automatically account for any wear in the roller or bottom surface 49 of the yoke.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

The invention claimed is:

1. A tree delimber, comprising:
   a) a base frame, said base frame including a horizontal roof;
   b) a delimber knife;
   c) a yoke assembly including a floor plate mounted on said horizontal roof for rotation about a vertical axis, said yoke assembly supporting said delimber knife above said floor plate and mounted for pivotal movement about a horizontal axis; and
   d) a roller system extending between said horizontal roof of said base frame and said floor plate of said yoke assembly and supporting said yoke assembly;
   e) said roller system including a roller unit mounted in said base frame;
   f) said roller unit including a support roller journalled in a roller box on an axle shaft and protruding upwardly through said horizontal roof;
   g) a roller adjustment member moveable in said roller box and engaging said shaft;
   h) said roller adjustment member being horizontally moveable in said roller box and effective to adjust and said roller vertically relative to said horizontal roof so as to properly support said floor plate; and
   i) a fluid pressure system for horizontally moving said roller adjustment member so as to urge said roller into proper support with said floor plate.

2. The tree delimber of claim 1 further characterized in that:
   a) said roller adjustment member includes a wedge shaped structure;
   b) said wedge shaped structure being moveable horizontally in said roller box and effective to support said shaft.

3. The tree delimber of claim 2 further characterized in that:
   a) said fluid pressure system includes a hydraulic cylinder having a piston rod extending horizontally therefrom;
   b) said rod being connected to said movable member.

4. The tree delimber of claim 2 further characterized in that:
   a) said roller system includes a pair of said roller units which are substantially identical to each other;
   b) each of said pair of roller units being mounted in opposite sides of said base frame.

5. The tree delimber of claim 2 further characterized in that:
   a) said horizontal axle shaft has a longitudinally extending flat formed in its side adjacent each end of the shaft;
   b) said wedge shaped structure engaging said flat to support said axle shaft, said flat being slidable on an inclined surface of said wedge shaped structure.

6. The tree delimber of claim 3 further characterized in that:
   a) said fluid pressure system is a hydraulic system;
   b) said hydraulic system including an accumulator connected to said hydraulic cylinder through a hydraulic line containing a check valve;
   c) said accumulator being effective to pressurize said cylinder, and through said piston and wedge shaped structure, urge said roller into support of said floor plate.

7. A tree delimber, comprising:
   a) a base frame;
   b) a delimber knife;
   c) a yoke assembly including a floor plate mounted on said base frame for rotation about a vertical axis, said yoke assembly supporting said delimber knife for pivotal movement about a horizontal axis; and
   d) a roller system disposed between said base frame and said floor plate and supporting said yoke assembly;
   e) said roller system including a roller unit mounted in said base frame;
   f) said roller unit including a support roller protruding upwardly from said base frame;
   g) a roller adjustment member being movable in said base frame to raise and lower said roller relative to said base frame so as to properly engage said base plate; and
   h) a fluid pressure system for automatically moving said roller adjustment member so as to urge said roller into support of said base plate.

8. The tree delimber of claim 7 further characterized in that:

a) said fluid pressure system includes a hydraulic cylinder having a piston rod extending horizontally therefrom;
b) said rod being connected to said roller adjustment member.

9. The tree delimber of claim 8 further characterized in that:
a) said roller system includes a pair of said roller units which are substantially identical to each other;
b) said roller units being mounted in opposite sides of said base frame.

10. The tree delimber of claim 9 further characterized in that;
a) each of said pair of roller units has a hydraulic cylinder and a piston rod connected to a corresponding roller support member;
b) said hydraulic cylinders being disposed between said pair of roller units.

* * * * *